(No Model.) 2 Sheets—Sheet 1.
J. PARKER.
SUGAR CANE SHREDDER.
No. 261,478. Patented July 18, 1882.

Witnesses
Harry Drury
Harry Smith

Inventor
John Parker
by his Attorneys
Howsm and Sons (No Model.) 2 Sheets—Sheet 2.

J. PARKER.
SUGAR CANE SHREDDER.

No. 261,478. Patented July 18, 1882.

Witnesses
Harry Drury
Harry Smith

Inventor
John Parker
by his Attorneys
Howson and Son

UNITED STATES PATENT OFFICE.

JOHN PARKER, OF NEW YORK, N. Y., ASSIGNOR OF ONE-HALF TO JAMES LANGLANDS COCHRANE, OF SAME PLACE.

SUGAR-CANE SHREDDER.

SPECIFICATION forming part of Letters Patent No. 261,478, dated July 18, 1882.

Application filed May 22, 1882. (No model.)

*To all whom it may concern:*

Be it known that I, JOHN PARKER, a subject of the Queen of Great Britain and Ireland, and a resident of New York city, New York, have invented certain Improvements in Sugar-Cane Shredders, of which the following is a specification.

My invention relates to machinery for shattering or shredding sugar-cane with the view of reducing it to the best condition for the extraction from it of a greater percentage of juice than can be obtained from unshredded cane; and the main feature of my invention consists of two drums, each having rows of teeth, one drum, which revolves slowly, serving to feed the stalks in limited quantities to the other toothed drum, which shatters the stalks and reduces them to shreds.

The main objects of my invention are to prevent the choking of the machine, to effect the shredding operation without subjecting the drums, gearing, or engine to shocks and strains, and to remove the shredded canes from the machine as fast as they are delivered by the drums.

Figure 1:
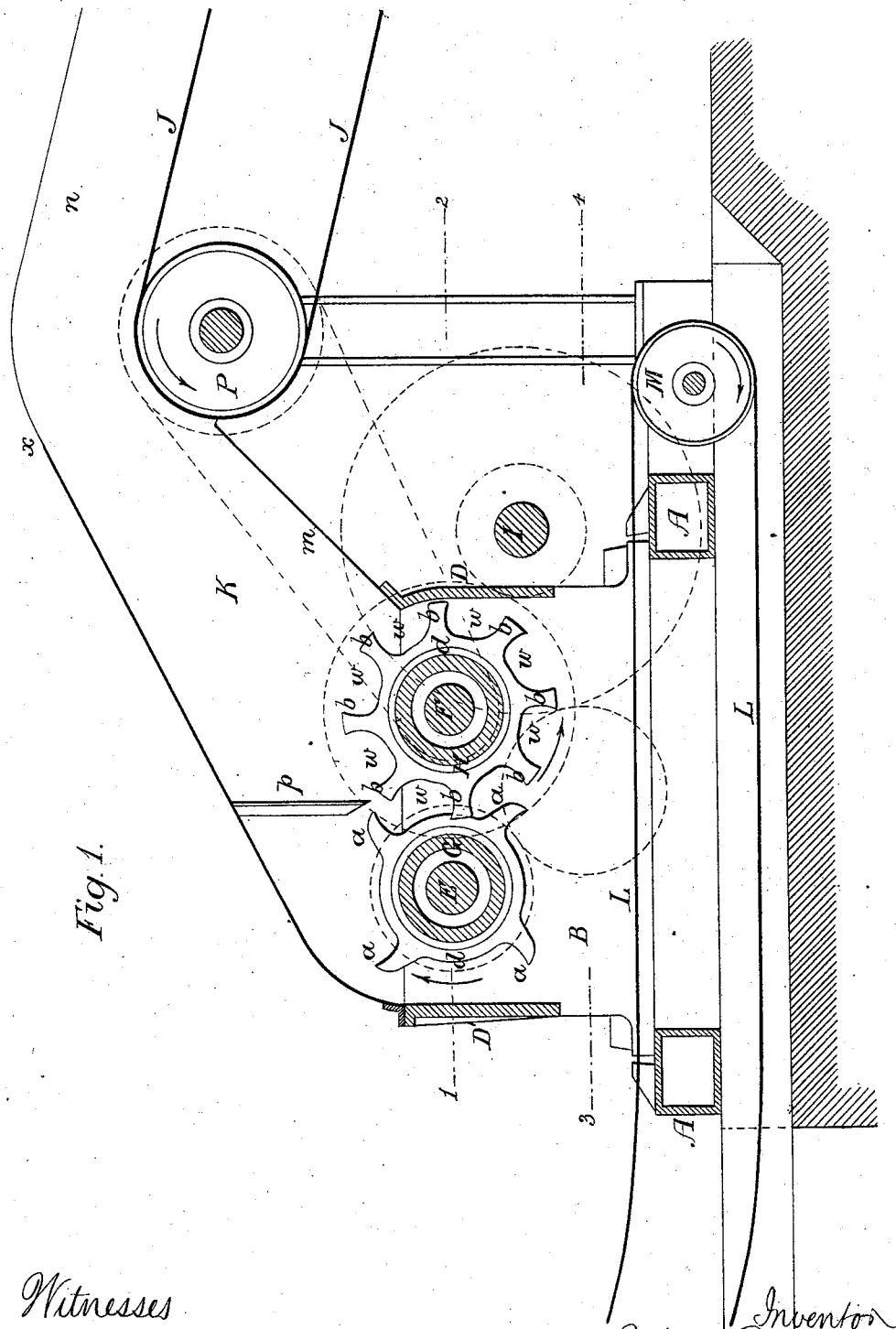
Figure 2:
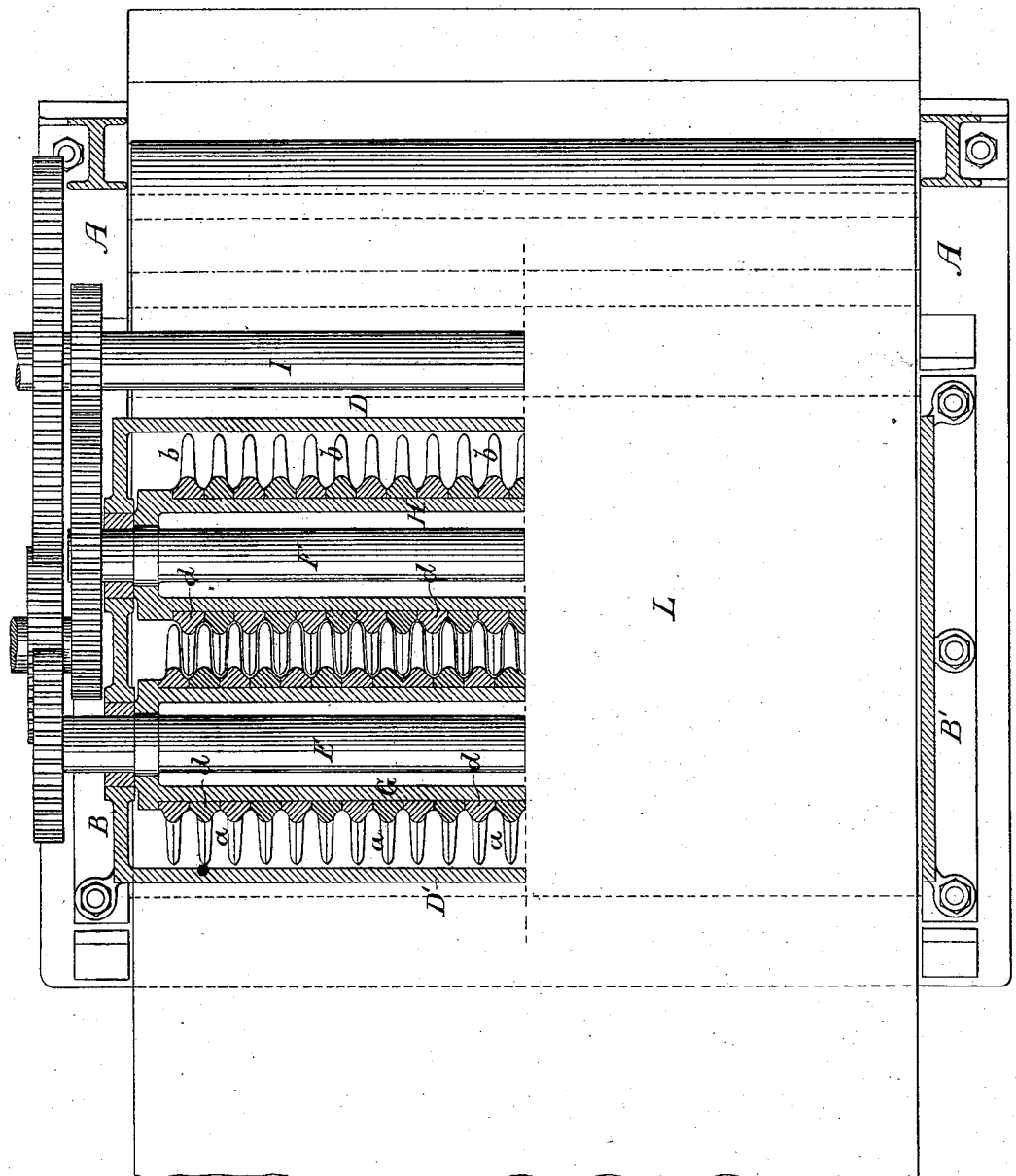

In the accompanying drawings, Figure 1, Sheet 1, is a vertical section of my improved cane-shredding machine; and Fig. 2, Sheet 2, a sectional plan view, partly on the line 1 2 and partly on the line 3 4.

To the base A of the machine is secured a quadrangular box-like structure or frame, B, in the opposite side of which two shafts, E and F, have their bearings, the shaft E passing through and being secured to a tubular shaft or drum, G, and a similar drum, H, being secured to the shaft F.

From the drum G project teeth $a$, and from the drum H the teeth $b$, the general conformation of these teeth being shown in Fig. 1, and the relation of the teeth of one drum to those of the other being shown in the plan view, Fig. 2, the teeth of one drum clearing those of the other to the extent of about one-eighth of an inch.

I have found that the best plan of constructing the toothed drums is to cast the teeth on rings $d$ and fit and secure the latter to the drums. In the present instance each ring of the drum G has four teeth and each ring of the drum H eight teeth. This, however, is not essential.

The driving shaft I, which may be the crankshaft of the engine, is geared to the shafts E and F by the system of cog-wheels shown in the plan view, Fig. 2, and indicated by the dotted lines in Fig. 1. By means of this gearing the toothed drum H is driven in the direction of the arrow, preferably at the rate of about thirty revolutions per minute, and the toothed drum G in the direction of its arrow at the rate of about one hundred and thirty-five revolutions per minute. It will be understood that these speeds are given as, in my opinion, the best for bringing about the best results, but without any desire to restrict myself to any specific speed. Neither do I restrict myself to the use of the gearing shown, although it is preferred, for a reason explained hereinafter.

An endless conveyer, J, part only of which is shown in the drawings, and which may be similar in construction to those appertaining to ordinary sugar-mills, passes over a drum, P, which is driven in the direction of the arrow.

A chute, K, is secured to the top of the quadrangular frame B and forms a hood-like covering for the same, the inclined bottom $m$ of this chute extending nearly to the endless conveyer, where the latter passes round the drum P, the top of the chute being continued to about the point $x$, Fig. 1, and the ends of the chute being continued beyond this point, so as to form the sides $n$ of a trough of which the endless conveyer J is the bottom.

A shield or guard, $p$, is preferably combined with the chute, the guard extending from side to side of the chute and being situated midway, or thereabout, between the drums G and H, the teeth of which, however, must clear the lower edge of the guard.

The stalks of cane to be operated on are placed lengthwise on and across the conveyer, and are tilted by the latter onto the inclined bottom of the chute, a few stalks falling into each space or pocket $w$ between the rows of teeth $b$ on the slowly-revolving drum H. As each of these spaces is of such limited capacity that it will not hold more than three or four stalks, the drum is a feeder which limits the number of stalks to be acted on at one time by the teeth of the rapidly-revolving drum G, the effect of the teeth of which is to shatter the stalks and reduce them to short lengths, so that the cane will be in the best condition for the extraction therefrom of the largest percentage of juice by the rolls of the sugar-mill. Before the teeth of the drum G have ceased to act on one bundle of stalks in one of the spaces or pockets $w$ between the rows of teeth on the drum H they commence to act on another bundle in the next space or pocket. Hence there is a uniform action which could not be attained without the above-described mode of feeding the stalks in bundles, and it will be well understood by those familiar with machinery of this class that the subjection of indiscriminate and different-sized masses of cane to the shredding-teeth is most trying both to the engine and gearing, owing to severe shocks at repeated intervals. In this connection it will be observed that by the gearing shown in Fig. 1 the strains on the shafts E and F are transmitted to the driving-shaft I, so as to act on the same in opposite directions, and thus tend to counteract and neutralize each other. The guard-plate $p$ prevents the crowding of the stalks into the drum G.

I prefer in all cases to combine with the above-described mechanism an endless conveyer, L, passing round a drum, M, and extending to any desired point, so as to receive the shredded cane and remove it as fast as it is discharged from and by the toothed drums. This conveyer may, for instance, extend as far as the mill for crushing the cane.

I claim as my invention—

1. The combination, in a cane-shredding machine, of the drum G, having teeth $a$, and the drum H, having teeth $b$, with gearing through the medium of which the said drums are driven, the former rapidly and the latter slowly, in the direction of their arrows, and with feed mechanism, substantially as described, whereby the canes are fed to the drum H in a direction transversely to their length, as set forth.

2. The combination of the toothed drums G and H, gearing for rotating the same in opposite directions and at different speeds, a guard-plate, $p$, and an endless conveyer and chute, whereby the canes are fed to the drum H in a direction transversely to their length, as set forth.

3. The combination, in a cane-shredding machine, of a toothed shredding-drum, a drum whereby the canes are fed in bundles to said shredding-drum, feeding mechanism whereby the canes are delivered to said feeding-drum in a direction transversely to their length, and a conveyer whereby the shredded canes are carried from the machine, as set forth.

4. The combination of the drums G and H and driving-shaft I of a cane-shredding machine, with gearing, substantially as described, whereby the strains on the drums G and H, due to the action upon the canes of the teeth of the drum G, are caused to exercise a counteracting influence on the shaft I, as set forth.

In testimony whereof I have signed my name to this specification in the presence of two subscribing witnesses.

JOHN PARKER.

Witnesses:
HULBERT PECK,
DAVID L. RAYMOND.